(12) United States Patent
Hymel et al.

(10) Patent No.: US 8,577,965 B2
(45) Date of Patent: Nov. 5, 2013

(54) KNOWLEDGE BASE BROADCASTING

(75) Inventors: James Allen Hymel, Kitchener (CA); Jean Philippe Bouchard, Waterloo (CA); Jeffery Erhard Lindner, Los Gatos, CA (US); Lawrence Elliot Nirenberg, Maple (CA); Jonathan Andrew Evans, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 217 days.

(21) Appl. No.: 13/035,136

(22) Filed: Feb. 25, 2011

(65) Prior Publication Data

US 2012/0221635 A1  Aug. 30, 2012

(51) Int. Cl.
*G06F 15/16* (2006.01)
*G06F 15/173* (2006.01)

(52) U.S. Cl.
USPC ........... 709/204; 709/203; 709/217; 709/226; 705/319

(58) Field of Classification Search
USPC ....................................................... 709/204
See application file for complete search history.

(56) References Cited

U.S. PATENT DOCUMENTS

| | | | |
|---|---|---|---|
| 6,958,692 B1 * | 10/2005 | Ratschunas | 340/539.13 |
| 6,962,287 B2 * | 11/2005 | Arai et al. | 235/382 |
| 6,967,903 B2 * | 11/2005 | Guanter | 368/224 |
| 7,010,569 B2 * | 3/2006 | Okayasu et al. | 709/204 |
| 7,584,217 B2 * | 9/2009 | Kasai | 1/1 |
| 7,787,697 B2 * | 8/2010 | Ritzau et al. | 382/224 |
| 7,797,019 B2 * | 9/2010 | Friedmann | 455/556.1 |
| 8,041,334 B2 * | 10/2011 | Yoon | 455/404.2 |
| 8,219,932 B2 * | 7/2012 | Rhee et al. | 715/838 |
| 8,271,196 B2 * | 9/2012 | Jones | 701/533 |
| 8,308,056 B2 * | 11/2012 | Millan Marco | 235/375 |
| 2005/0216531 A1 * | 9/2005 | Blandford | 707/204 |
| 2006/0044635 A1 * | 3/2006 | Suzuki et al. | 358/527 |
| 2006/0115108 A1 * | 6/2006 | Rodriguez et al. | 382/100 |
| 2006/0148528 A1 * | 7/2006 | Jung et al. | 455/566 |
| 2007/0233368 A1 | 10/2007 | Friedmann | |
| 2007/0286463 A1 | 12/2007 | Ritzau et al. | |
| 2007/0300179 A1 * | 12/2007 | Friedlander | 715/781 |
| 2007/0300260 A1 * | 12/2007 | Holm et al. | 725/47 |
| 2008/0263067 A1 * | 10/2008 | Diederiks et al. | 707/100 |
| 2009/0030765 A1 * | 1/2009 | Cameron et al. | 705/8 |
| 2009/0037594 A1 * | 2/2009 | Sever et al. | 709/230 |
| 2010/0029294 A1 * | 2/2010 | Matsuoka | 455/456.1 |
| 2010/0048242 A1 * | 2/2010 | Rhoads et al. | 455/556.1 |
| 2010/0191459 A1 * | 7/2010 | Carter et al. | 701/208 |
| 2010/0203904 A1 * | 8/2010 | Khokhlov | 455/457 |
| 2010/0277611 A1 * | 11/2010 | Holt et al. | 348/231.2 |
| 2010/0293183 A1 * | 11/2010 | Yaqub | 707/769 |

(Continued)

OTHER PUBLICATIONS

Extended European Search Report; Application No. 11156102.3; Jul. 20, 2011; 6 pages.

*Primary Examiner* — Melvin H Pollack
(74) *Attorney, Agent, or Firm* — Conley Rose, P.C.; J. Robert Brown, Jr.

(57) ABSTRACT

A method is provided for a mobile device to display information associated with a digital diary. The method comprises the mobile device initiating a search of a plurality of digital diaries for at least one digital diary containing information that indicates that an owner of the at least one digital diary currently is or previously has been present in the current location of the mobile device, and the mobile device displaying information associated with the at least one digital diary.

26 Claims, 3 Drawing Sheets

(56) References Cited

U.S. PATENT DOCUMENTS

| | | | |
|---|---|---|---|
| 2011/0022503 A1* | 1/2011 | Parker-Yules | 705/32 |
| 2011/0099478 A1* | 4/2011 | Gallagher et al. | 715/735 |
| 2011/0125844 A1* | 5/2011 | Collier et al. | 709/204 |
| 2011/0214090 A1* | 9/2011 | Yee et al. | 715/838 |
| 2011/0231488 A1* | 9/2011 | Xu | 709/204 |
| 2011/0270836 A1* | 11/2011 | Yang et al. | 707/737 |
| 2012/0047539 A1* | 2/2012 | Hao et al. | 725/82 |
| 2012/0266072 A1* | 10/2012 | Karaoguz | 715/733 |

* cited by examiner

KNOWLEDGE BASE BROADCASTING

BACKGROUND

A digital diary can be defined as a repository of information that is related to a single entity, managed by that entity, and stored in a digital form. The entity is typically an individual person but could be a group of people or some other type of organization. Information stored in an individual's digital diary might include data related to the person's likes, dislikes, work, hobbies, activities, preferences, opinions, decisions, artistic creations, critiques of art works or commercial products, information about friends and family, and/or any other information that the individual might wish to record. The information might be stored in the form of text, photographs, graphics, audio recordings, video recordings, and/or other media. The information might or might not be available to other people via the internet. Such a repository might also be referred to as a virtual diary, a knowledge base, or other names.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
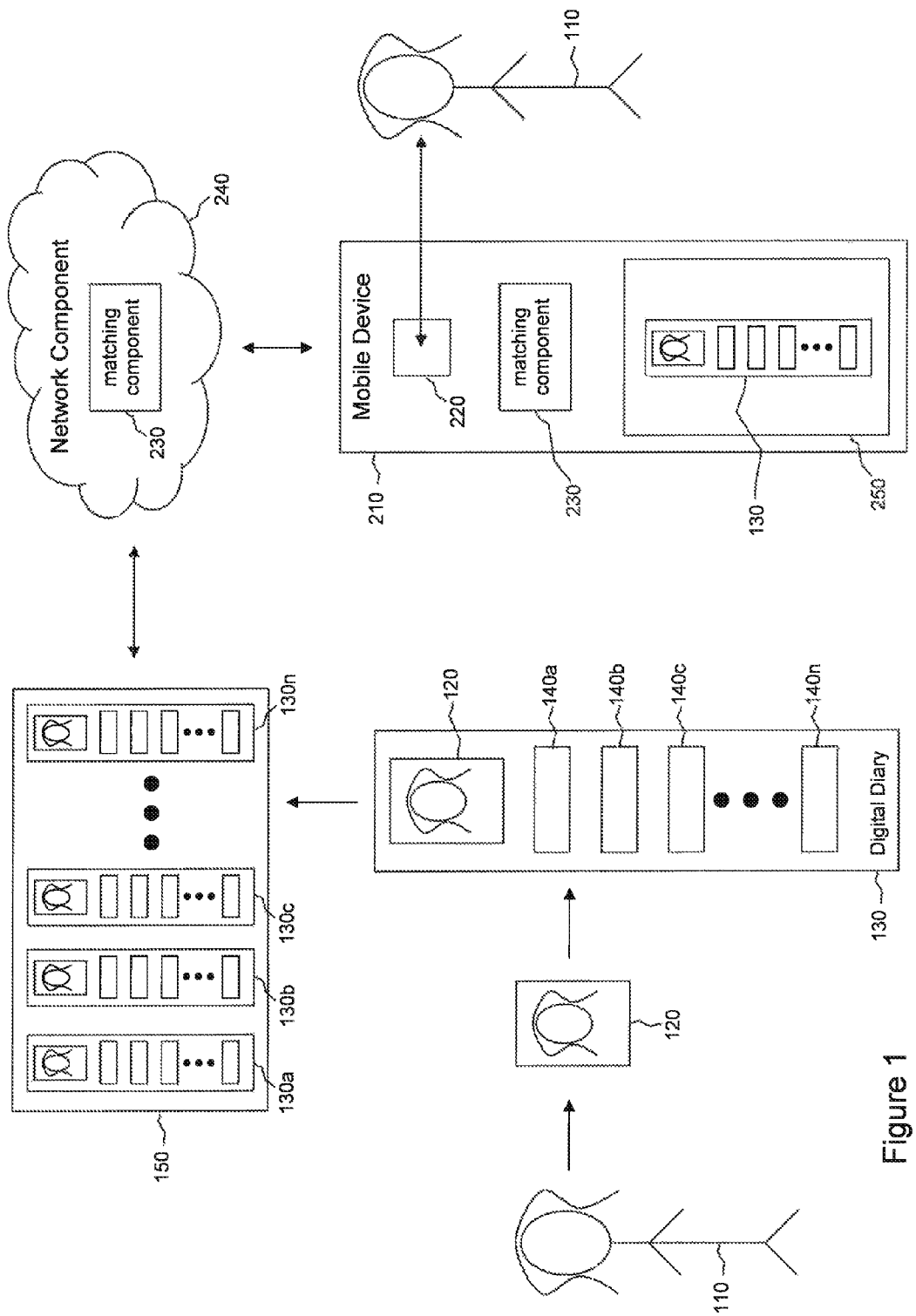
FIG. 1 illustrates a system for knowledge base broadcasting, according to an implementation of the disclosure.

It should be understood at the outset that although illustrative examples of one or more implementations of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with a full scope of equivalents of the claims.

Implementations of the present disclosure allow digital diaries to be made available to other individuals. More specifically, a mobile telecommunications device might be used to associate a person with that person's digital diary. The person may currently be or may previously have been present at the location where the mobile telecommunications device is present. In some cases, a facial recognition procedure might be used to associate the face of the person with a photograph of the person stored in the person's digital diary. In other cases, the association between the person and the person's digital diary might be performed in other ways. When such an association has been made, information in the person's digital diary might be made available to the mobile telecommunications device.

It is anticipated that at least a portion of the concepts disclosed herein will be implemented on a device such as a telephone, a smart phone, a personal digital assistant, a handheld, tablet, or laptop computer, or any similar device that is easily portable and has wireless telecommunications capabilities. Hereinafter, any such device will be referred to as a mobile device or simply a device.

Several examples may illustrate how the disclosed systems and methods might be implemented. In one example, a first person stores a photograph of herself in a digital diary. (To aid the clarity of the examples, the first person will be assumed to be female and a second person will be assumed to be male.) The photograph might be a 360 degree image or some other type of image that might allow the first person to be recognized from multiple angles. As with other digital diaries described hereinafter, the digital diary might be an existing digital diary that was previously created for a social networking application or for some other reason or might be a digital diary that has been newly created specifically for the purposes described herein.

The first person might then store the digital diary in a repository containing a plurality of digital diaries belonging to people who wish to make use of the digital diary publishing opportunities described herein. Alternatively, the first person might in some other manner designate that at least some portions of the digital diary may in some circumstances be made available to other people.

At a later time, the first person might be in a public location and might be noticed by a second person. If the second person wished to learn more about the first person, the second person might attempt to determine if a digital diary is available for the first person. To do so, the second person could point his mobile device at the first person and place the first person's face in the viewfinder of his mobile device. A facial recognition and matching procedure might then be performed on the first person's face to determine if the first person has made her digital diary publicly available. That is, a component that has access to a plurality of photographs in a plurality of digital diaries could determine whether the face viewed through the viewfinder of the mobile device matches a face in a published digital diary and could thereby determine whether a digital diary is available for the first person. The facial recognition and matching component could be a single component or a plurality of components and could reside wholly or partially on the mobile device or wholly or partially on a component on a network with which the mobile device can wirelessly communicate. Hereinafter, this component or group of components will be referred to as the matching component.

If the matching component determines that the first person has made her digital diary available, one or more events can occur on the second person's mobile device to inform the second person that the first person's digital diary is available. These events will be described in more detail below.

Alternatively, the facial recognition matching could be performed by a human rather than by an automated component. That is, the second person might visually scan through the photographs in a plurality of digital diaries in an attempt to find a photograph of the first person.

In another example, facial recognition is not needed in order for a digital diary to be shared. In this example, the location determination capabilities typically available on mobile devices can be used to determine when two or more people are currently near one another or when one person is currently in a location that was previously occupied by another person. It might then be determined whether the people have digital diaries that indicate that the people might share some common interests. Information associated with one person's digital diary might then be displayed on the other person's mobile device.

More specifically, a first person and a second person might be carrying mobile devices, and the mobile devices might be equipped with global positioning systems (GPS) or similar systems that can automatically update the digital diaries of the two people with the respective locations of the two people. A location matching component might be capable of comparing the location recorded in the digital diary of the first person with the location recorded in the digital diary of the second person. If a match between locations is found, it would be established that the devices are near one another. Alternatively, the mobile devices might be equipped with Bluetooth systems, near field communications systems, or other systems that might be capable of determining when the devices are near one another. The location matching component that performs the location-based matching may or may not be the same as the facial recognition and matching component described above.

If the location determination capabilities of two or more mobile devices establish that the devices are within some predefined distance of each other, one or more events as described below can occur on one or more of the mobile devices to inform the possessors of those mobile devices that a digital diary is available for a person nearby. Alternatively or additionally, a search can then be performed on the information stored in the digital diaries of the people for whom a location match was found. An event informing the device owners that a digital diary is available for a nearby person might occur only when there are sufficient commonalities in two or more digital diaries to indicate that one of the people might be interested in meeting one or more of the other people. This alternative can prevent a notification from appearing on a mobile device any time anyone with a publicly available digital diary is near the mobile device and can allow such notifications to occur only when a digital diary that may be of interest is available for a nearby person.

In a variation of this example, a first person's mobile device finds a match between its current location and a location associated with a data item in the digital diary of a second person, but the second person is not currently at the same location as the first person. In this case, the second person may have previously been in the first person's current location and may have stored in his digital diary a data item that is associated with that location. For instance, the second person may have taken a photograph in the location, geotagged the photograph with the geographic coordinates of the location, and added the photograph to his digital diary. Alternatively, the second person may have simply recorded in his digital diary the geographic coordinates of the location and possibly added one or more data items associated with the location that he finds interesting.

When the first person arrives at or near the location previously visited by the second person, the first person's digital diary might be automatically updated with the coordinates of that location. A location matching component might then compare the first person's location with a plurality of locations stored in a plurality of digital diaries. The location matching component might then determine that the first person's current location matches the location previously occupied by the second person. It might also be determined that one or data items that the second person recorded in his digital diary and that are associated with the location may be of interest to the first person. The location matching component, or some other component to which the location matching component can provide information, might then cause on the first person's mobile device an event informing her that a digital diary that might be of interest to her is available.

Several hypothetical scenarios might clarify this variation. In a first scenario, the first person and second person are friends who have not seen each other for some time. The second person visits a restaurant, takes photographs in the restaurant, and writes a review of the restaurant. The second person then stores the photographs and the review in his digital diary with the idea that someone else may be interested in seeing those portions of his digital diary at some point in the future. At a later time, the first person happens to visit the same restaurant, and her mobile device automatically stores her location in her digital diary. Her mobile device also automatically initiates a comparison between her current location and a plurality of locations stored in a plurality of other digital diaries. A location matching component then determines that she is in a location that matches the location stored in one or more other digital diaries. Some additional comparisons might be performed between the first person's digital diary and the other digital diaries in order to narrow down the number of location matches to only those that the first person might be interested in. These additional comparisons might establish the fact that her friend was previously in her current location. The first person's mobile device might then inform her that she is in a location recently visited by her friend and that her friend may have some information about the location that she might be interested in. The first person could then use her mobile device to view the photographs and restaurant review that were uploaded by the second person.

In a second scenario, a similar situation might exist, but rather than the first person and second person being acquainted with one another, the first person and second person might merely share a common interest. For instance, the first person and second person might both have fishing as a hobby. The second person might visit the restaurant as described above, but rather than writing a review of the restaurant, he might write some fishing tips for a nearby lake and record the tips in his digital diary along with the geographic coordinates of the restaurant and/or the lake. If the first person later visits the restaurant, her mobile device might automatically initiate a procedure that finds a match between her current location and interest in fishing and the location and fishing tips stored in the second person's digital diary. Her mobile device might then inform her that a digital diary that may be of interest to her is available.

In another variation of this example, a match might be made between the first person's current location and the second person's previous location based on photographs in the first person's and second person's digital diaries. That is, the second person may have previously taken a photograph of the location and stored it in his digital diary, and the first person may take a similar photograph of the same location and store it in her digital diary. An image recognition procedure might then be performed and might find a match between the two photographs of the location in the two different digital diaries. The first person's mobile device might then inform her that a digital diary that may be relevant to her current location is available.

In another example, the first person might use her mobile device to request to see the digital diaries of other people who are currently present at her location. A match between her location and the location of the other people might be made based on a match between GPS coordinates, a match between a photograph in her digital diary of her current location and photographs of that location in the digital diaries of the other people, a match between geotags on data in her digital diary and geotags on the data in the digital diaries of the other people, or on other types of location-based matches. After being shown at least portions of the digital diaries that are available for people at her location, she might browse through the digital diaries to find people she might be interested in meeting. If she finds someone who might be of interest, she could attempt to match a photograph in a digital diary to the face of someone at her location.

In yet another example, the first person might use her mobile device to determine if a second person who is known to her is nearby. For example, if the first person is in a crowded location where the second person might be present, the first person could instruct her mobile device to initiate a search for the digital diaries of all people at her current location. She could then instruct her mobile device to compare a photograph of the second person that she previously stored in her digital diary with the faces in the photographs in the digital diaries of the people known to be at her location. If a match is then found between the photograph of the second person in the first person's digital diary and the photograph of the second person in the second person's digital diary, the first person would know that the second person is somewhere in the crowd at her current location.

As mentioned above, when an association is successfully made between a digital diary and a person who currently is or previously has been at the location currently occupied by a mobile device, an event can occur on the mobile device informing the possessor of the device that a digital diary of possible interest is available. In some cases, the event consists of one or more entire digital diaries being displayed or being made available for display. In other cases, only portions of one or more digital diaries are displayed. The owner of a digital diary might specify which portions are to be displayed in such a situation, or all digital diaries might have a standard portion that is displayed in such a situation. The possessor of the mobile device might then perform some action in order to see an entire digital diary. In still other cases, an indicator might appear in the display of the mobile device to indicate that one or more digital diaries of possible interest are available. The possessor of the mobile device might then perform some action in order to select and view one or more of the indicated digital diaries.

In any of these cases, augmented reality techniques might be used to provide additional information in the display of the mobile device. For example, when the viewfinder of the mobile device is placed on the face of someone who has been determined to have a digital diary of interest, augmented reality techniques could be used to highlight that person's face.

The above discussion has focused for the most part on the use of only one parameter, such as facial recognition or a match between locations, to match a person to that person's digital diary. However, there may be cases where the use of multiple parameters may be helpful in narrowing down the set of potential matches. For example, the first person might see a second person that the first person is interested in, might frame the second person's face in the viewfinder of the first person's mobile device, and might then use the mobile device to initiate an automated facial recognition procedure in an attempt to match the second person's face to a photograph in a digital diary. If a search for the second person's face is performed through a large number of digital diaries, the facial recognition procedure may take a great deal of time and may return inaccurate results. To narrow the search, the first person might specify that the search be performed only among people whose digital diaries indicate that the people are near the first person's current location. This could greatly reduce the number of photographs for which the facial recognition procedure is performed.

It can be seen that the facial recognition procedure does not require that the second person have his mobile device with him. He merely needs to have previously uploaded a digital diary with his photograph to a digital diary repository that can be searched for his face. However, if he is not carrying his mobile device, a search may have to be performed through all the faces in the digital diary repository. If the second person does have his device with him and the device regularly updates his digital diary with his location, the search could be narrowed down by location first, and then facial recognition would need to be performed only on faces of people in that location.

As another example, if the first person happened to be at a location where a large number of people were present, such as at a sporting event, and if the first person were to perform a search for digital diaries of people at the same location, a large number of location-based matches might be found if a large number of people were carrying mobile devices that automatically updated the digital diaries of those people with the current locations of those people. The first person might narrow the search by seeking only people that are at the same location and that have digital diary information indicating that those people have a specified interest in common with her. Searches based on both location and common interests could be performed sequentially or in parallel. Alternatively or additionally, the first person might view photographs from digital diaries of people that are identified as being at the first person's current location and might then visually search the location for faces that match the photographs.

In general, multiple-parameter searches based on facial recognition, location matching, and/or matching of common interests could consider these parameters in any order or in parallel. In other implementations, a search through a digital diary repository could be narrowed down based on parameters or combinations or parameters other than facial recognition, location matching, or matching of common interests. Such parameters could be used in any sequence or in parallel to reduce the number of digital diaries that are returned from a search.

In the above examples, the information in a digital diary was freely available to anyone who wished to view the information. In some implementations, at least a portion of the information in a digital diary might be available only for purchase or rental. As an example, a celebrity may be the focus of a lecture, a book signing, a news conference, or some other public event. Audience members at the event may be able to determine, using facial recognition, location matching, or some other technique, that the celebrity has a digital diary available. However, some or all of the information in the digital diary might be protected by a digital rights management (DRM) system or a similar system that makes the information available only while the event is occurring and only if a fee is paid to temporarily access the information. An audience member who wished to view the content that was protected in this manner might use a mobile device to pay the required fee and temporarily gain access to the protected content.

As another example, a person who is not necessarily a celebrity may feel that he has fictional or non-fictional stories to tell that may be of interest to other people. Such a person may include in his digital diary freely available information that describes the stories in a manner that might pique the interest of potential readers. The person may then charge a fee for other people to purchase full access to the stories.

In a variation of these examples, the information in a digital diary might be used to promote a paid appearance by the owner of the digital diary. That is, a celebrity, an expert in a field of knowledge, or some other person of interest might charge an appearance fee or a fee for an opportunity for live sharing of knowledge. The digital diary of such a person might contain information on how to arrange for the person to make a paid live appearance or to otherwise share the person's knowledge. Someone viewing the digital diary of such a person could use the digital diary to request a paid live appearance.

In an implementation, the data that is shared in a digital diary can differ depending on the digital diary owner's current location, the current time of day, the current time of year, and/or other parameters. For example, a digital diary owner might specify that when the location information recorded in her digital diary indicates that she is at work, only the work-related information in her digital diary should be available. When the location information indicates that she is away from work, all of the information in her digital diary might be made available. As another example, work-related information might be made available only during normal working hours, and personal information might be made available only outside normal working hours. As another example, the digital diary owner might specify that the sports-related information that is available in her digital diary should be limited only to summer sports in the summer and only to winter sports in the winter. In other implementations, these or other parameters could be used in other ways to limit the portions of a digital diary that are available with respect to a given time and/or place.

In an implementation, information about a first person's personal interactions can be automatically logged into the first person's digital diary as the interactions occur. The interaction information can then be available in real time to a second person who gains access to the first person's digital diary. As an example, the first person might include contact information for herself in her digital diary, and her digital diary might be automatically updated whenever anyone uses the contact information to attempt to reach her. Her digital diary might also record her responses to the attempts to reach her. Anyone considering contacting her could then read her digital diary to gain some insight into how receptive she might currently be to engage in some type of interaction. For instance, while she is in a coffee shop, she might receive requests from six different people to initiate an email, text, or actual conversation and might decline all six requests. The requests and her refusals to accept the requests could be automatically or manually recorded in her digital diary. A seventh person at the coffee shop who may be interested in meeting her could see in her digital diary that she has declined all attempts to communicate with her while she has been in the coffee shop and could conclude that she is not currently interested in social interaction.

In an implementation, the digital diaries of a plurality of people might be linked together in a group of digital diaries. For example, a group of people who share a common interest, work for the same company, or have one or more other characteristics in common might each choose to include in his or her digital diary an indication of the characteristics that the people have in common. When a first person in the group is viewed through the viewfinder of a mobile device, an augmented reality indicator might appear in the viewfinder to indicate that the first person belongs to a group. If the user of the mobile device wished to find other members of the same group, the user of the mobile device could scan the viewfinder across multiple faces. The same augmented reality indicator might appear in the viewfinder when the face of a second person in the group came into view. In this way, the user of the mobile device could easily identify multiple members of the same group among a larger crowd of people. Alternatively, instead of a plurality of people manually placing themselves in a group, a plurality of digital diaries might be automatically linked based on one or more commonalities in the digital diaries.

FIG. 1 illustrates an implementation of a system for knowledge base broadcasting. The illustrated system uses a facial recognition procedure to match a person to that person's digital diary, but similar systems might be used to match people to digital diaries in any of the ways described above or in other ways that will be readily suggested in view of the present disclosure. A person 110 takes or selects a photograph 120 of her face that she wishes to include in a digital diary 130. The photograph 120 might be a 360 degree view of the face of the person 110 or some other type of photograph that is appropriate for use in a facial recognition procedure. The person 110 stores the photograph 120 in the digital diary 130 along with a plurality of items 140 of personal information about the person 110. The digital diary 130 might be a pre-existing knowledge base that the person 110 has created for some other purpose, such as a profile on a social networking web site. Alternatively, the digital diary 130 might be a knowledge base that the person 110 has created specifically for the knowledge base sharing purposes described herein.

The person 110 uploads the digital diary 130 to a repository 150 of digital diaries 130. The repository 150 is not necessarily a single entity as shown. The repository 150 is merely a collection of digital diaries 130 that may or may not reside in the same location and that can be searched based on the information contained in the digital diaries 130. Alternatively or additionally, the repository 150 could be one or more existing social networking web sites or similar web sites. Certain profiles or other knowledge bases stored on the web sites could be tagged as digital diaries 130 to indicate that the knowledge bases are available for the knowledge base sharing purposes described herein.

If the person 110 is in a public location, she might be noticed by a second person (not shown) who would like to find out if the person 110 has a digital diary available for viewing. The second person could point a mobile device 210 at the person 110 and frame the face of the person 110 in the viewfinder 220 of the mobile device 210. The second person could then use the mobile device 210 to initiate a facial recognition procedure on the person 110.

The facial recognition procedure might be carried out by a matching component 230 that resides wholly or partially on the mobile device 210 or wholly or partially on a network component 240 with which the mobile device 210 can wirelessly communicate. It is anticipated that the facial recognition procedure may entail a great deal of processing power, and therefore the matching component 230 may reside for the most part on the network component 240. That is, the mobile device 210 may merely capture an image of the face of the person 110 and send the image to the network component 240. The matching component 230 on the network component 240 may then perform a matching procedure on the image.

In the matching procedure, the matching component 230 searches through the photographs in the digital diaries 130 in the repository 150 to attempt to find a face in one of the photographs that matches the facial image that was received from the mobile device 210. As mentioned above, searching through a large number of photographs in the repository 150 could be time consuming and prone to error, so the set of digital diaries 130 through which the search is performed could be reduced before the facial recognition search is begun. In some implementations, the mobile device 210 might upload its current location to its owner's digital diary 130 in the repository 150 or might in some other way make its current location known to the matching component 230. A search could then be performed for the digital diaries 130 that indicate that the owners of the digital diaries 130 are currently present at the same location where the mobile device 210 is present. A facial recognition search could then be performed on the narrowed-down list of digital diaries 130 belonging to people in the same location as the mobile device 210. In other implementations, the set of digital diaries 130 on which the facial recognition search is performed could be narrowed down based on other parameters stored in the digital diaries 130.

If a match is found between the face of the person 110 as viewed through the viewfinder 220 of the mobile device 210 and a face in one of the digital diaries 130 in the repository 150, it can be assumed that that digital diary 130 belongs to the person 110. Information associated with that digital diary 130 can then sent from the repository 150 to the mobile device 210 via the network component 240 and displayed on a display 250 of the mobile device 210. As mentioned above, the information that is displayed might be the entire digital diary 130, a portion of the digital diary 130, an indicator that the digital diary 130 is available, an augmented reality indication that the person 110 is a member of a group with common interests, and/or some other type of information.

Figure 2:
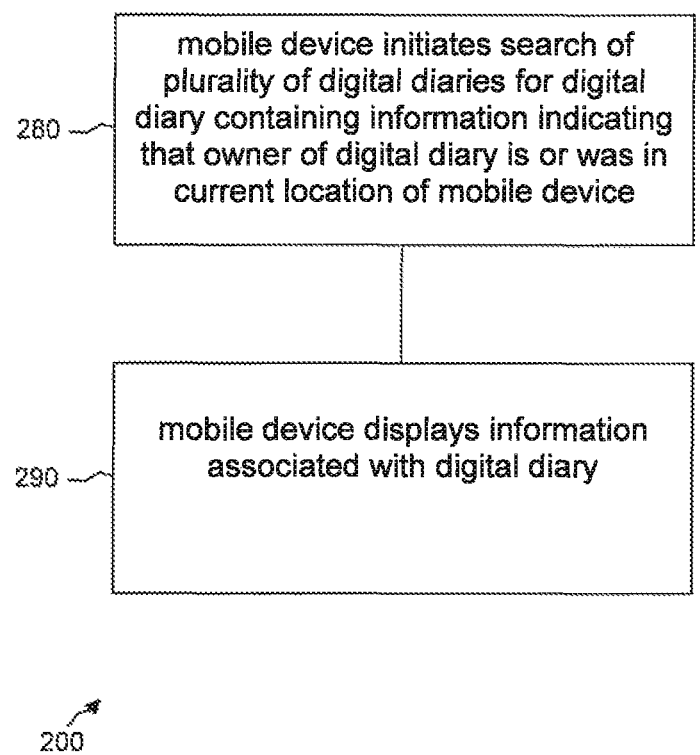
FIG. 2 is a flowchart for a method for a mobile device to display information associated with a digital diary, according to an implementation of the disclosure.

FIG. 2 illustrates an implementation of a method 200 for a mobile device to display information associated with a digital diary. At block 280, the mobile device initiates a search of a plurality of digital diaries for at least one digital diary containing information that indicates that an owner of the at least one digital diary currently is or previously has been in the current location of the mobile device. At block 290, the mobile device displays information associated with the at least one digital diary.

While some concepts exist in the prior art dealing with exchanging information, these concepts typically deal with an exchange of information between people who have already met or with one person searching for information about another person after becoming aware of the other person. The implementations described herein, however, could allow a first person to obtain information about a second person that the first person might be interested in but has not yet met or could allow a first person to find a second person that the first person might want to meet but is not yet aware of.

Figure 3:
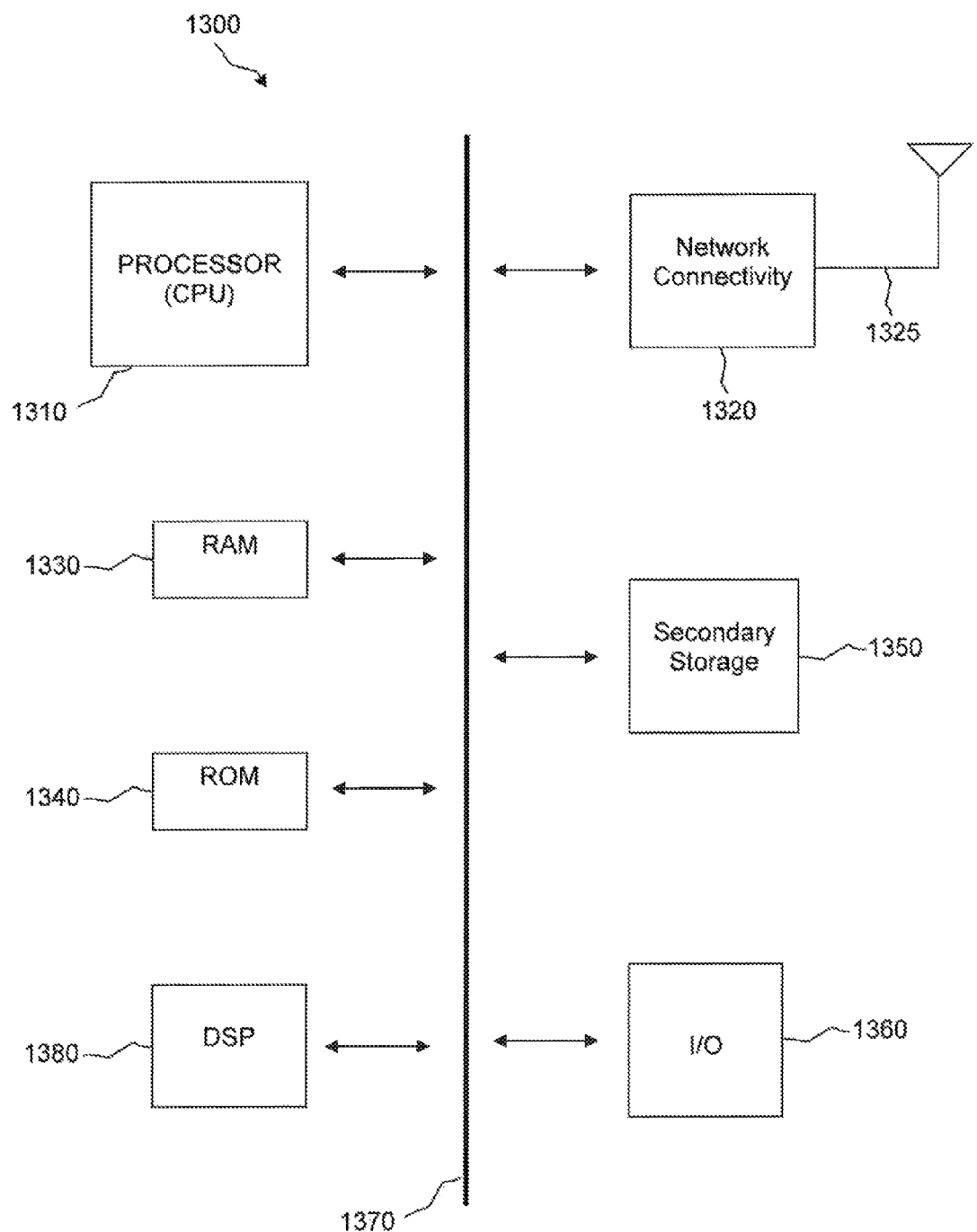
FIG. 3 illustrates a processor and related components suitable for implementing the present disclosure.

The components described above might be implemented on a device that includes a processing component that is capable of executing instructions related to the actions described above. FIG. 3 illustrates an example of a system 1300 that includes a processing component 1310 suitable for one or more of the implementations disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an implementation, a mobile device is provided. The mobile device comprises a processor configured such that the mobile device initiates an attempt to find an association between a digital diary and a person who currently is or previously has been present at a location currently occupied by the mobile device.

In another implementation, a method is provided for a mobile device to display information associated with a digital diary. The method comprises the mobile device initiating a search of a plurality of digital diaries for at least one digital diary containing information that indicates that an owner of the at least one digital diary currently is or previously has been present in the current location of the mobile device, and the mobile device displaying information associated with the at least one digital diary.

In another implementation, a network component is provided. The network component includes a processor configured such that the network component attempts to find an association between a digital diary and a person who currently is or previously has been present at a location currently occupied by a mobile device from which the network component has received a request to initiate the attempt.

While several implementations have been provided in the present disclosure, it should be understood that the disclosed systems and methods may be implemented in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile device, comprising
   a processor configured to:
   identify a digital diary, in a repository of a plurality of digital diaries, associated with a person who currently is or previously has been present at a location currently occupied by the mobile device based on location data contained in the digital diary; and
   receive at least a portion of the location data in the digital diary in response to identifying the digital diary.

2. The mobile device of claim 1, wherein the digital diary is identified by
   a match between current geographic coordinates of the mobile device and geographic coordinates stored in the digital diary.

3. The mobile device of claim 1, wherein the digital diary is identified by at least one of:
   a match between a photograph of the location taken by the mobile device and a photograph of the location in the digital diary; and
   a match between the current geographic location of the mobile device and a geographic location associated with a data item stored in the digital diary.

4. The mobile device of claim 1, wherein, when the digital diary is identified, the processor is further configured to display information associated with the digital diary on the mobile device, the information associated with the digital diary being of:
   the at least the portion of the location data in the digital diary received; or
   an indication that the digital diary is available.

5. The mobile device of claim 4, wherein the information associated with the digital diary that is displayed on the mobile device is derived from a search based on a plurality of parameters, the plurality of parameters including at least two of:
   recognition of a face in a photograph in the digital diary;
   recognition of a face at the location;
   matching of a location in the digital diary with the location of the mobile device; and
   matching of an interest recorded in the digital diary with an interest of an owner of the mobile device.

6. The mobile device of claim 4, wherein the information associated with the digital diary that is displayed on the mobile device differs depending on at least one of:
   the current location of the person;
   the current time of day; and
   the current time of year.

7. The mobile device of claim 4, wherein the information associated with the digital diary is at least one of:
   made available for no charge;
   made available for purchase; and
   made temporarily available for a rental fee.

8. The mobile device of claim 4, wherein the digital diary contains information related to a group to which the person belongs, and wherein an indicator indicating membership in the group is displayed when the information associated with the digital diary is displayed.

9. The mobile device of claim 1, wherein the digital diary contains information related to an interaction that was performed by the person and that was automatically recorded in the digital diary.

10. A method for a mobile device comprising:
    identifying digital diary, in a repository of a plurality of digital diaries, associated with a person who currently is or previously has been present at a location currently occupied by the mobile device based on location data contained in the digital diary, and
    receiving, by the mobile device, at least a portion of the location data in the digital diary, in response to identifying the digital diary.

11. The method of claim 10, wherein the location data is at least one of:
    a photograph of the current location that matches a photograph of the current location taken by the mobile device; and
    geographic coordinates that match current geographic coordinates of the mobile device.

12. The method of claim 10, further comprising:
    upon identifying the digital diary, displaying on the mobile device information associated with the digital diary, the information being at least one of:

the at least the portion of the location data in the digital diary; and an indication that the digital diary is available.

13. The method of claim 10, wherein the information associated with the digital diary that is displayed on the mobile device is derived from a search based on a plurality of parameters, the plurality of parameters including at least two of:

recognition of a face in a photograph in the digital diary;

recognition of a face at the location;

matching of a location in the digital diary with the location of the mobile device; and matching of an interest recorded in the digital diary with an interest of an owner of the mobile device.

14. The method of claim 10, wherein the information associated with the digital diary that is displayed on the mobile device differs depending on at least one of:

the current location of the person;

the current time of day; and the current time of year.

15. The method of claim 10, wherein the information associated with the digital diary is at least one of:

made available for no charge;

made available for purchase; and made temporarily available for a rental fee.

16. The method of claim 10, wherein the digital diary contains information related to a group to which the owner belongs, and wherein an indicator indicating membership in the group is displayed when the information associated with the digital diary is displayed.

17. The method of claim 10, wherein the digital diary contains information related to an interaction that was performed by the owner and that was automatically recorded in the digital diary.

18. A network component, comprising:

a processor configured to:

identify a digital diary, in a repository of a plurality of digital diaries associated with a person who currently is or previously has been present at a location currently occupied by a mobile device based on location data contained in the digital diary; and in response to identifying the digital diary, send at least a portion of the location data in the digital diary to the mobile device.

19. The network component of claim 18, wherein the digital diary is identified by a match between current geographic coordinates of the mobile device and geographic coordinates stored in the digital diary.

20. The network component of claim 18, wherein the digital diary is identified by at least one of:

the network component matching a photograph of the location received from the mobile device with a photograph of the location in the digital diary; and the network component matching the current geographic location of the mobile device, as received from the mobile device, with a geographic location associated with a data item stored in the digital diary.

21. The network component of claim 18, wherein, when the digital diary is identified, the network component sends information associated with the digital diary to the mobile device, the information being at least one of:

the at least the portion of the location data in the digital diary; and an indication that the digital diary is available.

22. The network component of claim 21, wherein the information associated with the digital diary that is sent to the mobile device is derived from a search based on a plurality of parameters, the plurality of parameters including at least two of:

recognition of a face in a photograph in the digital diary;

recognition of a face at the location;

matching of a location in the digital diary with the location of the mobile device; and matching of an interest recorded in the digital diary with an interest of an owner of the mobile device.

23. The network component of claim 21, wherein the information associated with the digital diary that is sent to the mobile device differs depending on at least one of:

the current location of the mobile device;

the current time of day; and the current time of year.

24. The network component of claim 21, wherein the information associated with the digital diary is at least one of:

made available for no charge;

made available for purchase; and made temporarily available for a rental fee.

25. The network component of claim 21, wherein the digital diary contains information related to a group to which an owner of the digital diary belongs, and wherein an indicator indicating membership in the group appears in the display screen of the mobile device when the information associated with the digital diary is sent to the mobile device.

26. The network component of claim 18, wherein the digital diary contains information related to an interaction that occurred on the mobile device and that was automatically recorded in the digital diary.

* * * * *

UNITED STATES PATENT AND TRADEMARK OFFICE
CERTIFICATE OF CORRECTION

PATENT NO. : 8,577,965 B2  
APPLICATION NO. : 13/035136  
DATED : November 5, 2013  
INVENTOR(S) : James Allen Hymel et al.

Page 1 of 1

It is certified that error appears in the above-identified patent and that said Letters Patent is hereby corrected as shown below:

In the Claims:

Claim 10, Column 12, Line 49, replace "identifying digital diary," with -- "identifying a digital diary," --

Signed and Sealed this  
Seventh Day of January, 2014

Margaret A. Focarino  
*Commissioner for Patents of the United States Patent and Trademark Office*